US012592958B2

(12) United States Patent
Qiu et al.

(10) Patent No.: US 12,592,958 B2
(45) Date of Patent: Mar. 31, 2026

(54) FLEXIBLE DETERMINISTIC FINITE AUTOMATA (DFA) TOKENIZER FOR AI-BASED MALICIOUS TRAFFIC DETECTION

(71) Applicant: Intel Corporation, Santa Clara, CA (US)

(72) Inventors: Kun Qiu, Shanghai (CN); Hao Chang, Shanghai (CN); Ying Wang, Shanghai (CN); Wenjun Zhu, Shanghai (CN); Xiahui Yu, Shanghai (CN); Yingqi Liu, Shanghai (CN); Baoqian Li, Shanghai (CN); Weigang Li, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 775 days.

(21) Appl. No.: 17/744,463

(22) Filed: May 13, 2022

(65) Prior Publication Data

US 2022/0279013 A1 Sep. 1, 2022

(30) Foreign Application Priority Data

Mar. 30, 2022 (WO) ................ PCT/CN2022/083944

(51) Int. Cl.
*H04L 9/32* (2006.01)
*G06F 16/242* (2019.01)
(Continued)

(52) U.S. Cl.
CPC ...... *H04L 63/1441* (2013.01); *G06F 16/2433* (2019.01); *G06F 16/90344* (2019.01);
(Continued)

(58) Field of Classification Search
CPC ... H04L 63/1441; H04L 9/3213; H04L 63/02; G06F 16/2433; G06F 16/90344; G06N 20/00
(Continued)

(56) References Cited

U.S. PATENT DOCUMENTS 11,444,978 B1 * 9/2022 Liao .......................... G06N 3/04
12,056,169 B1 * 8/2024 Mishra ................... G06N 20/10
(Continued)

*Primary Examiner* — Thanh T Le
(74) *Attorney, Agent, or Firm* — Compass IP Law PC

(57) ABSTRACT

Methods and apparatus for a flexible Deterministic Finite Automata (DFA) tokenizer for AI-based malicious traffic detection. A DFA compiler is used to process profiles, such as SQLi, HTML5 and XSS profiles, as well as user-defined profiles, to generate corresponding DFA transition tables. The DFA tokenizer includes a DFA engine that employs the DFA transition table(s) to generate token sequences derived from input strings. The token sequences are converted into feature vectors using a feature extraction engine, and the feature vectors are used for training a machine learning/Artificial Intelligence (AI) model configured to perform binary classification (benign or malicious). During run-time, strings are extracted from input received via a network and tokenized with the DFA tokenizer to generate token sequences that are converted into feature vectors. The feature vectors are then classified using the AI model to determine whether the input is benign or malicious.

20 Claims, 20 Drawing Sheets

(51) Int. Cl.
    *G06F 16/903*        (2019.01)
    *G06N 20/00*         (2019.01)
    *H04L 9/40*          (2022.01)

(52) U.S. Cl.
    CPC ............ *H04L 9/3213* (2013.01); *H04L 63/02*
             (2013.01); *G06N 20/00* (2019.01)

(58) Field of Classification Search
    USPC ......................................................... 726/22
    See application file for complete search history.

(56)                   References Cited

U.S. PATENT DOCUMENTS

| | | | |
|---|---|---|---|
| 12,238,119 B1* | 2/2025 | Chivu ..................... | H04L 41/16 |
| 12,242,807 B2* | 3/2025 | Alonichau ............ | G06F 40/284 |
| 2003/0187633 A1* | 10/2003 | Fairweather ........... | G06F 8/427 |
| | | | 704/9 |
| 2004/0162826 A1* | 8/2004 | Wyschogrod ..... | G06F 16/90344 |
| 2008/0030383 A1* | 2/2008 | Cameron ............... | H03M 7/00 |
| | | | 341/55 |
| 2008/0034427 A1* | 2/2008 | Cadambi ............ | H04L 63/1425 |
| | | | 726/22 |
| 2010/0138534 A1* | 6/2010 | Mutnuru ............. | H04L 43/0817 |
| | | | 709/224 |
| 2012/0290736 A1* | 11/2012 | McMillen ............. | H04L 63/145 |
| | | | 709/231 |
| 2017/0277800 A1* | 9/2017 | Lucas ....................... | G06F 8/40 |
| 2018/0307831 A1* | 10/2018 | Anand .................. | G06F 21/554 |
| 2018/0349602 A1* | 12/2018 | Johns .................... | G06F 21/552 |
| 2020/0195667 A1* | 6/2020 | Li ....................... | H04L 63/1433 |
| 2021/0019309 A1* | 1/2021 | Yadav ................. | G06F 16/2428 |
| 2021/0075690 A1* | 3/2021 | Janakiraman ......... | G06F 40/289 |
| 2021/0150022 A1* | 5/2021 | Karas .................... | G06F 21/552 |
| 2021/0295181 A1* | 9/2021 | Goyal .................. | G06F 9/4498 |
| 2021/0367961 A1* | 11/2021 | Kuppa ..................... | G06N 5/04 |
| 2022/0113969 A1* | 4/2022 | Chang ................ | G06F 9/30038 |
| 2022/0171628 A1* | 6/2022 | Hong ................. | G06F 9/30032 |
| 2022/0253691 A1* | 8/2022 | Rokka Chhetri .... | G06N 3/0464 |
| 2022/0284190 A1* | 9/2022 | Alonichau ........... | G06F 40/284 |
| 2023/0231830 A1* | 7/2023 | Shin .................... | H04L 63/0245 |
| | | | 726/1 |
| 2023/0239271 A1* | 7/2023 | Shin ....................... | H04L 61/35 |
| | | | 726/1 |
| 2023/0319108 A1* | 10/2023 | Gechman .............. | G06N 3/045 |
| | | | 726/22 |

* cited by examiner

400A

400B

Transition table

|      | 0 | 1 |
|------|---|---|
| →A   | C | B |
| B    | C | B |
| C    | C | D |
| *D   | D | D |

Figure 8:
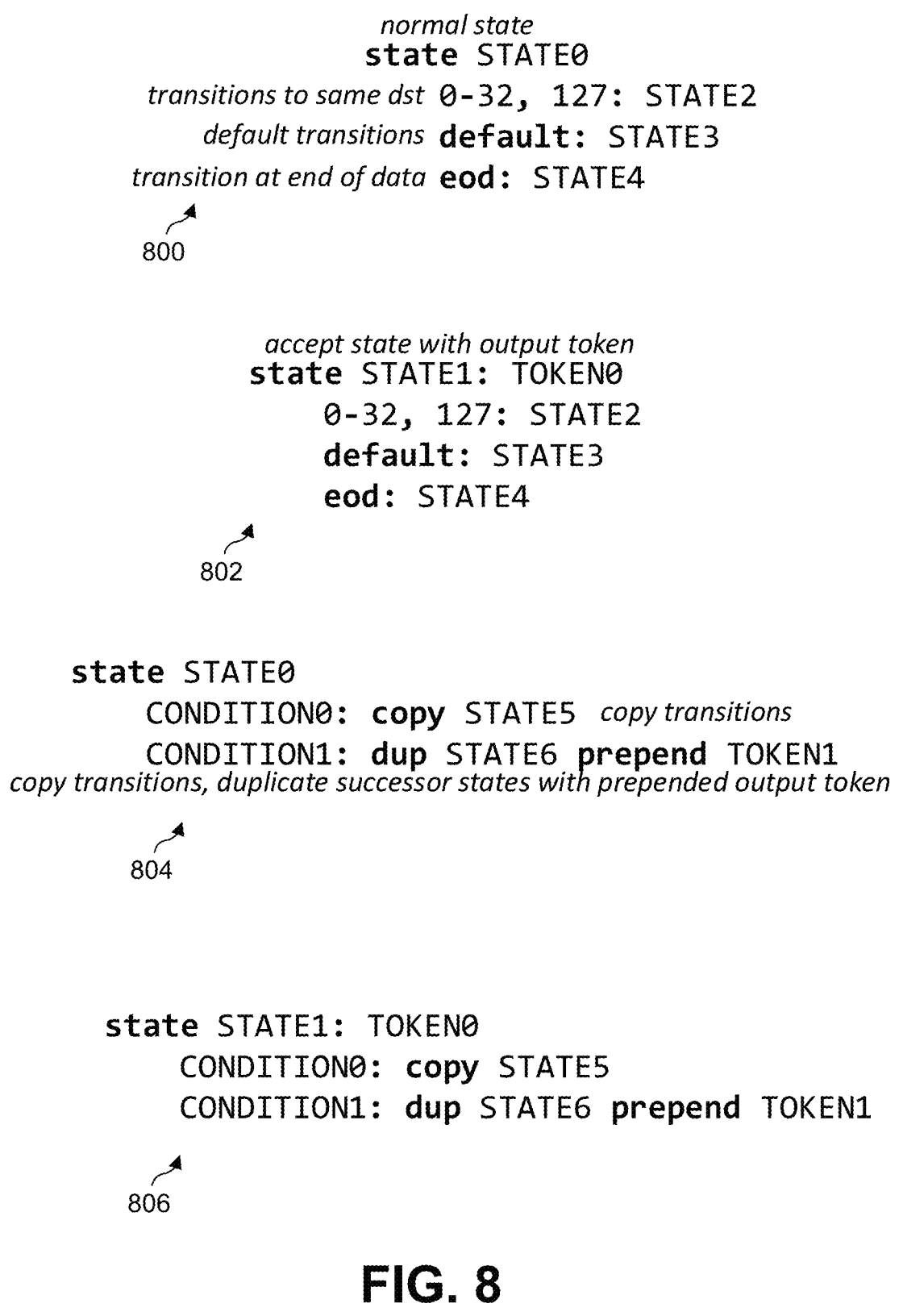

*normal state*
state STATE0
*transitions to same dst* 0-32, 127: STATE2
*default transitions* default: STATE3
*transition at end of data* eod: STATE4

800

*accept state with output token*
state STATE1: TOKEN0
0-32, 127: STATE2
default: STATE3
eod: STATE4

802 state STATE0
CONDITION0: copy STATE5 *copy transitions*
CONDITION1: dup STATE6 prepend TOKEN1
*copy transitions, duplicate successor states with prepended output token*

804 state STATE1: TOKEN0
CONDITION0: copy STATE5
CONDITION1: dup STATE6 prepend TOKEN1

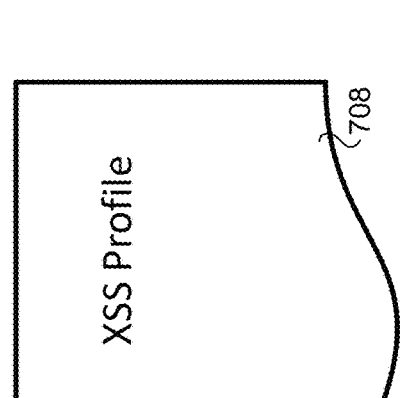

```
: :
: :
9602 state ISCLOSE-TAGNAME_LISTENER
9603    9, 10, 11, 12, 13, 32, 47, 62: dup ISCLOSE-TAG_NAME_NODICT prepend TYPE_TAG_RISK
9604    default: copy ISCLOSE-TAG_NAME_NODICT
9605    eod: EOF-TNO
9606
9607 state ISCLOSE-TAGNAME_NOSCRIPT
9608    9, 10, 11, 12, 13, 32, 47, 62: dup ISCLOSE-TAG_NAME_NODICT prepend TYPE_TAG_RISK
9609    default: copy ISCLOSE-TAG_NAME_NODICT
9610    eod: EOF-TNO
9611
9612 state ISCLOSE-TAGNAME_VMLFRAME
9613    9, 10, 11, 12, 13, 32, 47, 62: dup ISCLOSE-TAG_NAME_NODICT prepend TYPE_TAG_RISK
9614    default: copy ISCLOSE-TAG_NAME_NODICT
9615    eod: EOF-TNO
9616
9617 # END of Profile XSS
```

XSS Profile

Profile generator

```
. . .
   while Q not empty
      S = dequeue(Q)
      cb_start
      for each child C of S
          cb_main
          enqueue(Q, C)
      end for
      cb_end
   end while
. . .
```

1108

DFA Profile fragment

```
. . .
state WORD_DA
   84, 116: WORD_DAT
   89, 121: WORD_DAY
   46: WORD
   32,91,...,9-13,34,160,0: dup ENTRY prepend TYPE_BAREWORD
   default: WORD #(not prefix or keyword)
. . .
```

1110

AND
AS
DATE
DAY 1102
1104 (typ)
1106 (typ)
1100

DFA Profile Template

```
#state WORD_ABC        #(if ABC is prefix, not full keyword)
#    D, d: WORD_ABCD   #(if ABCD is prefix or keyword)
#    E, e: WORD_ABCE   #(if ABCE is prefix or keyword)
#    46: WORD_ABC.     #(if ABC. is prefix or keyword)
#    46: WORD          #(if ABC. is not prefix or keyword)
#    UNTIL: dup ENTRY prepend TYPE_BAREWORD
#    default: WORD #(not prefix or keyword)
```
1202

```
#state WORD_AS         #(if AS is full keyword of TYPE_X)
#    D, d: WORD_ASD    #(if ASD is prefix or keyword)
#    E, e: WORD_ASE    #(if ASE is prefix or keyword)
#    46, UNTIL: dup ENTRY prepend TYPE_X
#    default: WORD     #(not prefix or keyword)
```
1204

```
#state WORD
#    UNTIL: dup ENTRY prepend TYPE_BAREWORD
#    default: WORD
```
1206

*T[][]* : *state transition table*
*A[]*    : *accept list*
*V*       : *input string*

```
func dfa_engine(T[][], A[], V)
        for each input character C of V
                S = T[S][C]
                if S is accept state then
                        output A[S]
                end if
        end for
end func
```

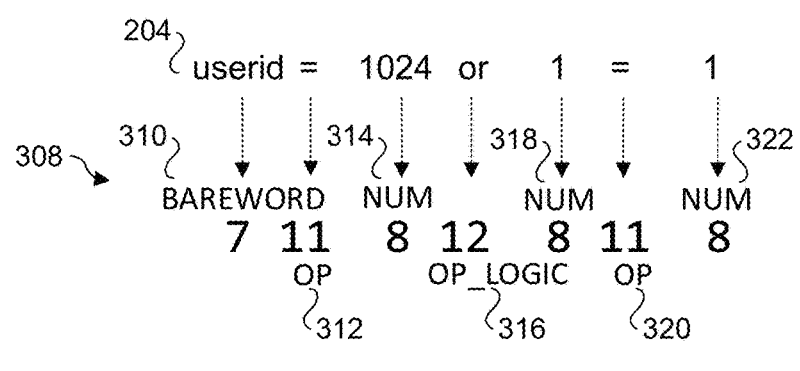
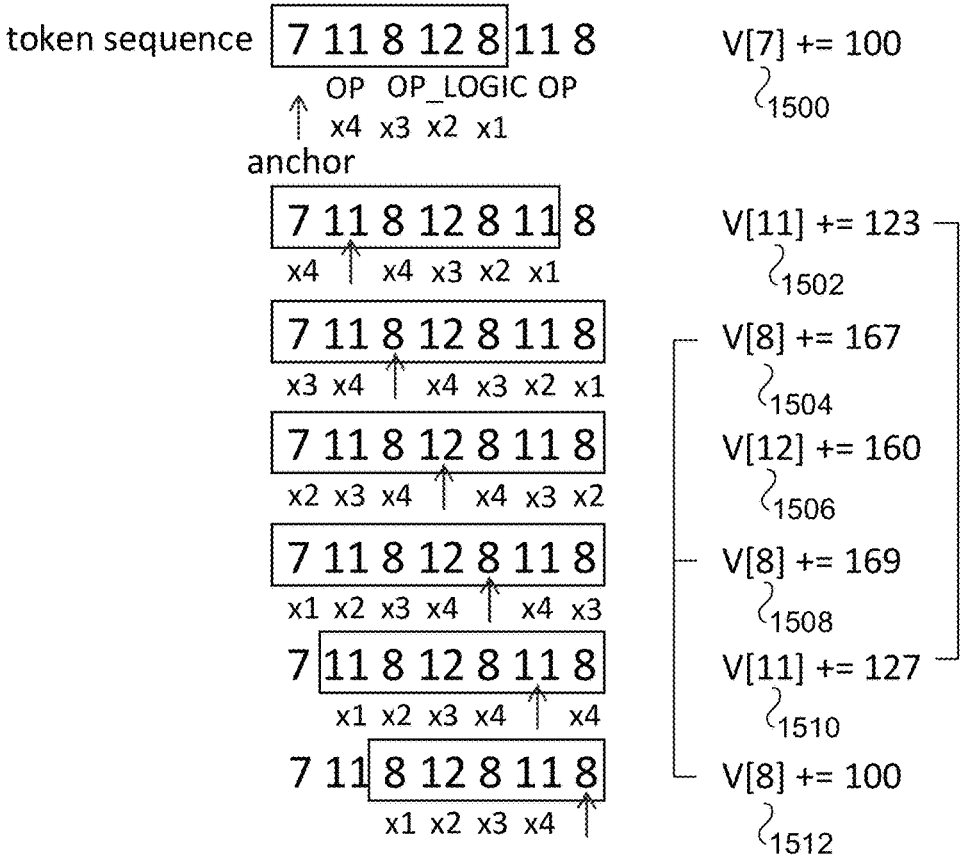
FIG. 15

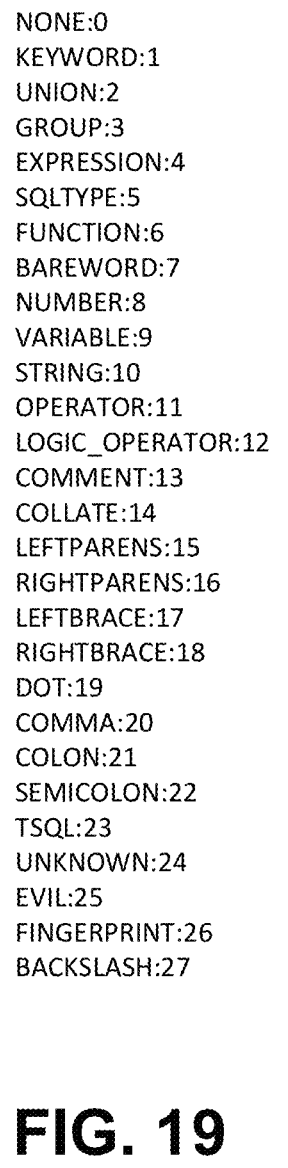

NONE:0
KEYWORD:1
UNION:2
GROUP:3
EXPRESSION:4
SQLTYPE:5
FUNCTION:6
BAREWORD:7
NUMBER:8
VARIABLE:9
STRING:10
OPERATOR:11
LOGIC_OPERATOR:12
COMMENT:13
COLLATE:14
LEFTPARENS:15
RIGHTPARENS:16
LEFTBRACE:17
RIGHTBRACE:18
DOT:19
COMMA:20
COLON:21
SEMICOLON:22
TSQL:23
UNKNOWN:24
EVIL:25
FINGERPRINT:26
BACKSLASH:27

FIG. 19

| | Overall | Tokenize | Feature Extraction | AI Predict |
|---|---|---|---|---|
| Regex | >100us | | | |
| Libinjection | ~1.6 us | | | |
| Traditional ML Solution | > 1s | | | |
| Embodiment of solution | ~1.0us | ~0.4 us | ~0.1us | ~0.5us |

FIG. 20

FLEXIBLE DETERMINISTIC FINITE AUTOMATA (DFA) TOKENIZER FOR AI-BASED MALICIOUS TRAFFIC DETECTION

RELATED APPLICATION

This application claims the benefit of priority to Patent Cooperation Treaty (PCT) Application No. PCT/CN2022/083944 filed Mar. 30, 2022. The entire content of that application is incorporated by reference.

BACKGROUND INFORMATION

A Web Application Firewall (WAF) is a type of firewall that evolved to protect Web Applications from cyber-attacks. Recently, the emerging artificial-intelligence (AI)-based WAF is becoming more attractive and being more widely adopted for its advantages of better automation, scalability and coverage of emerging threats by nature, compared with traditional rule-set based WAF products.

Current AI-based WAFs generally work in the following manner. The WAF extracts messages from network traffic, extract tokens from the messages using a tokenizer, and employs an AI model to judge whether the tokens are malicious or not. The various tokenizers in the current WAFs are limited in performance, which reduces the overall AI-based WAF performance observed during benchmark testing. Moreover, different tokenizers do not have any unified APIs (Application Program Interfaces), which may decrease their flexibility and maintainability.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein like reference numerals refer to like parts throughout the various views unless otherwise specified:

FIG. 8 is a diagram illustrating four general syntax examples implemented for a profile, according to one embodiment;

FIG. 10 is a diagram illustrating a portion of an XSS profile;

FIG. 12 is a diagram illustrating a portion of a DFA profile template;

FIG. 13 is a pseudocode listing for a DFA engine function, according to one embodiment;

FIG. 15 is a diagram illustrating an example of converting a token sequence into a feature vector, according to one embodiment;

FIG. 19 shows an example of the features for the 28 columns in the feature vector encoding format used in the SQLi example herein;

FIG. 20 is a table illustrating comparative performance results between and embodiment of the WAF solution and conventional WAF implementations.

DETAILED DESCRIPTION

Figure 1:
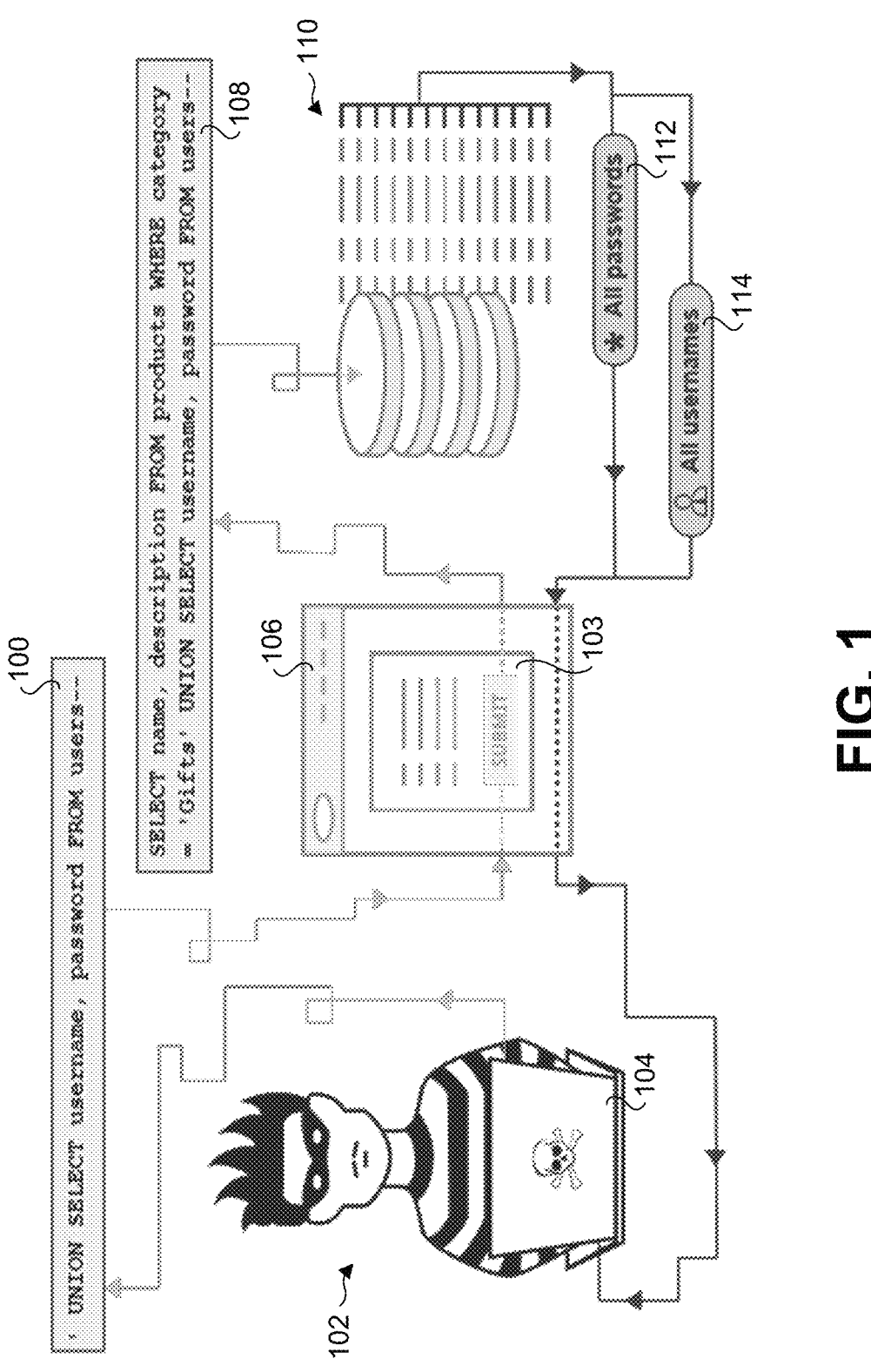
FIG. 1 is a diagram illustrating an example of a SQL injection attack.

Embodiments of methods and apparatus for flexible Deterministic Finite Automata (DFA) tokenizer for AI-based malicious traffic detection are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

For clarity, individual components in the Figures herein may also be referred to by their labels in the Figures, rather than by a particular reference number. Additionally, reference numbers referring to a particular type of component (as opposed to a particular component) may be shown with a reference number followed by "(typ)" meaning "typical." It will be understood that the configuration of these components will be typical of similar components that may exist but are not shown in the drawing Figures for simplicity and clarity or otherwise similar components that are not labeled with separate reference numbers. Conversely, "(typ)" is not to be construed as meaning the component, element, etc. is typically used for its disclosed function, implement, purpose, etc.

AI-based WAFs generally use two types of tokenizers: 1) a tokenizer for word encoding; and 2) a tokenizer for lexical encoding. OpenNMT is a widely utilized open-source tokenizer used for word encoding. It can automatically convert characters and words into tokens and assign them token identifiers (IDs). OpenNMT is often used as tokenizer to encode web files (e.g., HTML, XML, or JSON) to tokens for malware file detection in the WAF.

For lexical encoding, libinjection is an open-source library that includes a tokenizer that can encode programming syntax such as SQL (Structured Query Language) and HTML5. A difference between word encoding and lexical encoding is under lexical encoding the token type of a current word is dependent on previous neighbor tokens. Example uses of libinjection include use for SQL injection (SQLi) detection and use for Cross-site Script detection in WAF.

SQL injection is a web security vulnerability that allows an attacker to interfere with the queries that an application makes to its database. It generally allows an attacker to view data that they are not normally able to retrieve. This might include data belonging to other users, or any other data that the application itself is able to access. A successful SQL injection exploit can read sensitive data from a database, modify database data (Insert/Update/Delete), execute administration operations on the database (such as shutdown the DBMS), recover the content of a given file present on the DBMS file system and in some cases issue commands to the operating system. A successful SQL injection attack may also result in unauthorized access to sensitive data, such as passwords, credit card details, or personal user information. Many high-profile data breaches in recent years have been the result of SQL injection attacks, leading to reputational damage and regulatory fines. In some cases, an attacker can obtain a persistent backdoor into an organization's systems, leading to a long-term compromise that can go unnoticed for an extended period. In addition, an attacker can escalate an SQL injection attack to compromise the underlying server or other back-end infrastructure, or perform a denial-of-service attack.

As shown in FIG. 1, a SQL injection attack consists of insertion or "injection" of a SQL query 100 submitted by an attacker 102 (human or machine) via the input data 103 from a client 104 to an application 106 accessed via a network. For example, the application may be a Web-hosted application such as a PHP or ASP application. SQL Injection is common with PHP and ASP applications due to the prevalence of older functional interfaces.

The application 106 processes SQL query 100 to generate an internal SQL query 108 that is used to access database 110. A query result including all passwords 112 and all usernames 114 is returned to client 104, thus enabling attacker 102 to access usernames and associated passwords.

Figure 2:
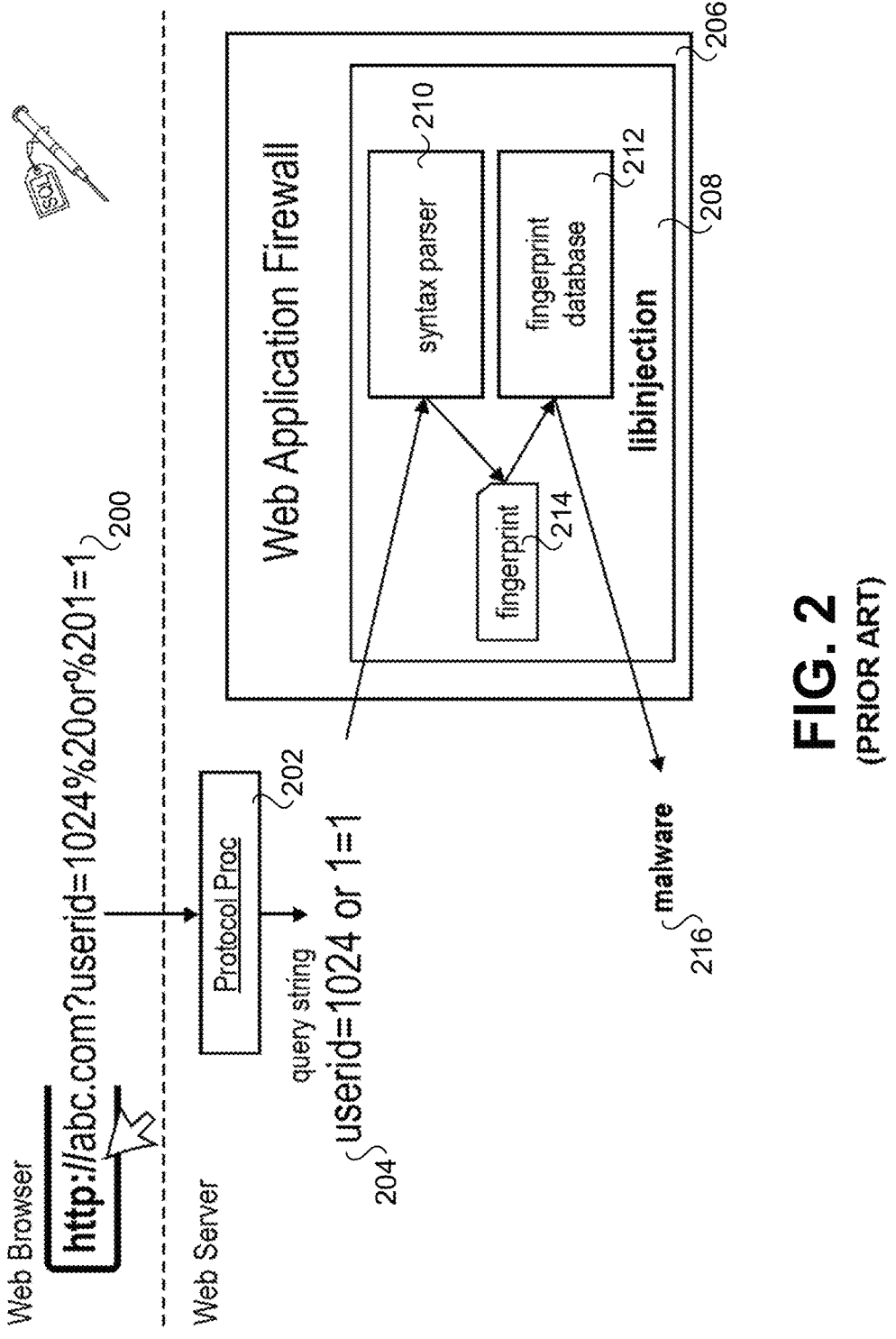
FIG. 2 is a diagram illustrating an example of how conventional Web Application Firewall employing libinjection identifies a potential SQL injection attack.

FIG. 2 shows an example of a SQLi detection process utilizing libinjection. A user of a Web browser enters a URL 200 into the address bar as shown (or otherwise such is generated by a machine). An HTTP Get request with URL 200 is sent to a Web server that parses the URL with a protocol process 202 to extract a query string 204. The query string 204 is then passed to a Web application firewall 206 employing libinjection 208. For example, Web application firewall 206 may be a ModSecurity WAF.

ModSecurity, sometimes called Modsec, is an open source WAF the provides an array of Hypertext Transport Protocol (HTTP) request and response filtering capabilities along with other security features across different platforms include Apache HTTP Server, Microsoft IIS and Nginx. The Modsec platform provides a rule configuration language known as 'SecRules' for real-time monitoring, logging, and filtering of HTTP communications based on user-defined rules. ModSecurity is commonly deployed to provide protections against generic classes of vulnerabilities using the OWASP ModSecurity Core Rule Set (CRS), which is an open-source set of rules written in ModSecurity's SecRules language. The project is part of OWASP, the Open Web Application Security Project. Several other rule sets are also available.

The libinjection deployment in WAF 206 includes a syntax parser 210 and a fingerprint database 212. Syntax parser 210 is part of the libinjection tokenizer that uses complex parsing logic and a compression method to encode a query string (204) of "userid=1024 or 1=1" into a short fingerprint 214, then it performs pattern matching for the fingerprint in a large database (fingerprint database 212) to detect the presence of a SQLi attack. When a match is found, WAF 206 generates an output indicating detected presence of malware 216.

Under a conventional tokenizer, character strings are broken down into tokens, such as individual words or a short sequence of words, which correspond to fingerprints 214. Such a conventional tokenizer is implemented in software source code as a large number of nested IF-ELSE statements. When implemented on hardware (e.g., via execution of compiled source code on one or more cores on a CPU or processor), an IF-ELSE based tokenizer has low performance due to the large number of branch predictions and cache misses. In addition, the Modsec WAF is costly to handle emerging threats and new use cases as it uses hardcoded profiles and databases (with current support limited to HTTP and SQL). This solution is also difficult to offload to hardware.

Under aspects of the embodiments described and illustrated herein, a DFA-based tokenizer design is provided that can significantly increase the performance and flexibility of AI-based WAFs. At a high level the DFA-based tokenizer employs two main components: a generator and a tokenizer. The generator supports user-define token profiles. It can convert a formatted profile into a specific DFA. The tokenizer is a DFA-based engine that provides a high-performance tokenization capability.

Figure 3:
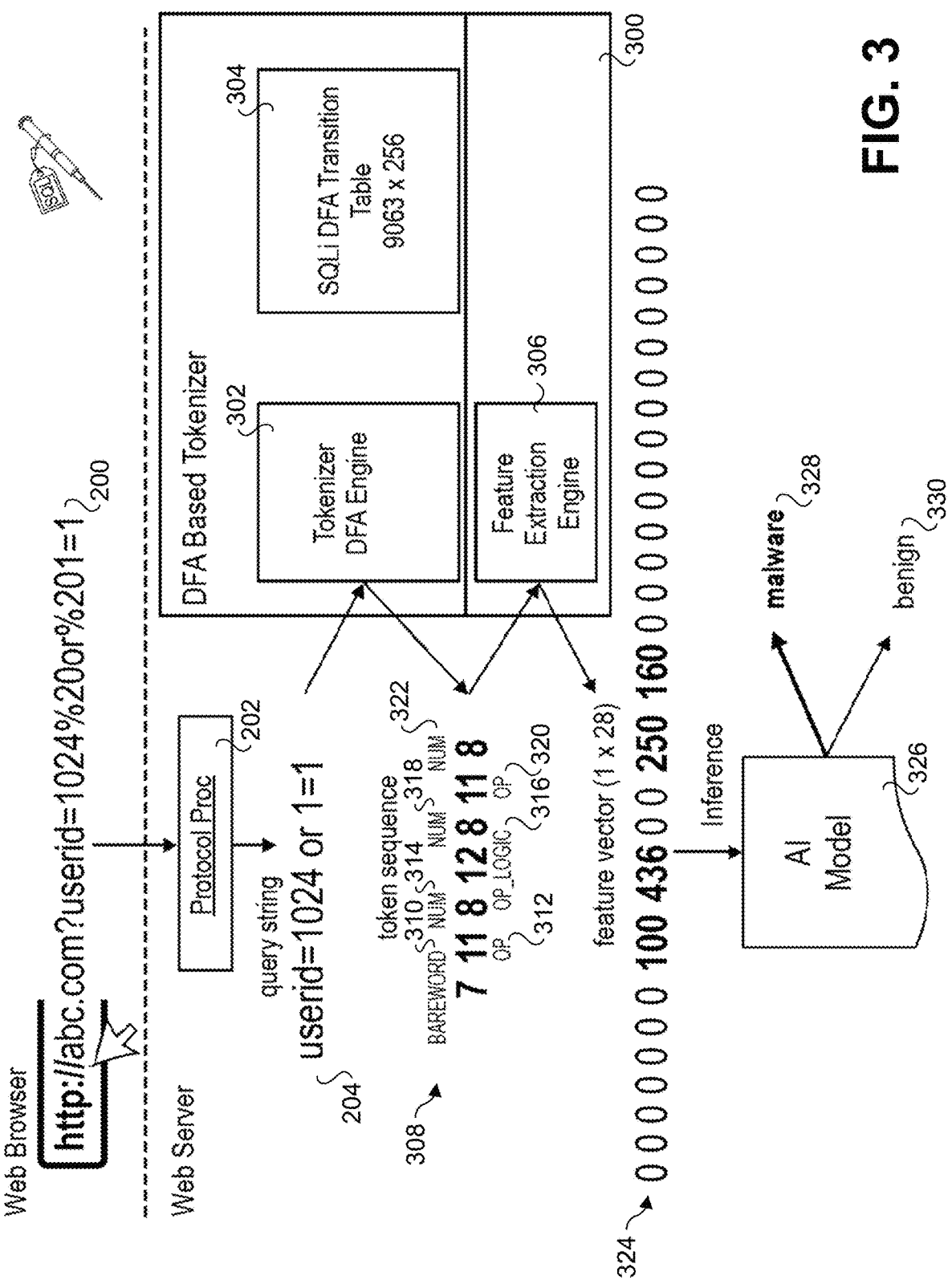
FIG. 3 is a diagram illustrating an embodiment of a WAF solution employing a DFA based tokenizer, feature extraction engine, and an AI model that are used to detect SQL injection attacks.

FIG. 3 shows an exemplary flow using the DFA based tokenizer. As before, a URL 200 is sent from the Web browser via an HTTP request to the Web server, which employs protocol process 202 to extract query string 204 of "userid=1024 or 1=1." Query string 204 is forwarded to a tokenizer DFA engine 302 in an DFA based tokenizer 300 which also includes a SQLi DFA transition table 304 and a feature extraction engine 306. tokenizer DFA engine 302 performs lookups against SQLi DFA transition table 304 to generate a token sequence 308.

Under the token sequences that are generated, including token sequence 308, a query string is broken down into a sequence of tokens, where each token comprises a numerical entry and associated character or character string in the DFA transition table that is employed. For query string 204 of "userid=1024 or 1=1" the token sequence '7' '11' '8' '12' '8' '11' '8' comprises a bareword 310 'userid', op (operator) 312 '=', num(ber) 314 '1024', op_logic (logic operator) 316 'or', num 318 '1', op 320 '=', and num 322 '1'.

Many Machine Learning (ML) and AI models employ artificial neural networks that operate on numerical data (also commonly referred to as deep learning). While some ML frameworks support character-based inputs (data that does not need to be converted to a numerical form first), those character-based inputs are converted to numeric values before they are processed by the model, as computers only work on binary data. Thus, there is a need to convert the token sequence into a numerical form.

Token sequence '7' '11' '8' '12' '8' '11' '8' is provided to feature extraction engine 306, which converts the token sequence into a feature vector 324. In this example, the feature vector is a single dimension vector having a length of 28 digits (as depicted by 1×28). ML and AI models, such as the AI model 326 shown in FIG. 3 and discussed below generally operate on sparse feature vectors under which most of the features are encoded as '0's, such as depicted here. Further details of the feature extraction and feature vector generation process are described below.

The feature vectors generated by feature extraction engine 306 are provided as input to AI model 326, which has been trained using a training dataset (or multiple training datasets for a distributed implementation) comprising sparse feature vectors having a similar format (1×28) in some implementations, noting that some ML frameworks support denser encoding of sparse feature vectors and as a result the vectors in the training dataset may not need to be encoded as 1×28 vectors. The feature vectors in the training dataset(s) are derived by processing various input strings such as SQLi query strings that represent benign and malicious SQL statements or SQL code snippets. AI model 326 is a binary classification model that is used to classify feature vector inputs into two classes: either malware (328) or benign (330). Generally, the classification model is a generalization of the specific examples in the training dataset. For a given feature vector to be evaluated by AI model 326 there will either include a match for the feature vector in the training data or (more commonly) the AI model may be used to identify feature vectors that are close to feature vectors in the training dataset using inference.

Various types of ML algorithms and frameworks may be used to implement AI model 326. For example, an AI model comprises an artificial neural network (ANN), also commonly referred to as a deep learning model may be implemented using one or many available ANN frameworks, such as but not limited to TensorFlow/Keras, PyTorch, Caffe, Microsoft Cognitive Toolkit (formerly CNTK), and DeepPy. Another class of ML algorithms are well-suited for binary classification of sparse feature vectors are boosted models such as XGBoost and CatBoost. Other types of ML algorithms that are targeted to binary classification of sparse feature vectors may likewise be used, where the particular type and implementation of the AI model and associated ML model is outside the scope of this disclosure.

Deterministic Finite Automata

To better understand how the DFA generator and tokenizer may be implemented and operate the following brief DFA primer is provided. Various techniques for generating DFAs are known in the art and the particular approach to be used is outside the scope of this disclosure.

A DFA consists of:
1. a finite set of states (denoted $Q$)
2. a finite set $\Sigma$ of symbols (e.g., alphabet)
3. a transition function that takes as argument a state and a symbol and returns a state (denoted $\delta$)
4. a start state (denoted $q_0$)
5. a set of final or accepting states (denoted F)

Thus, we have $q_0 \in Q$ and $F \subseteq Q$.

A DFA is mathematically represented as a 5-uple,
$(Q, \Sigma, \delta, q_0, F)$.

Figure 4A:
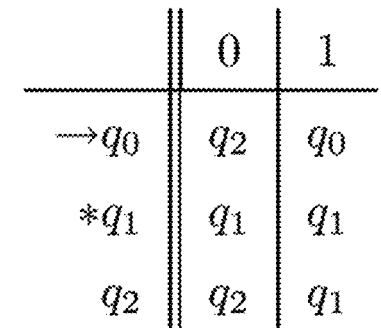
FIG. 4A is a diagram of a DFA transition table.
Figure 4B:
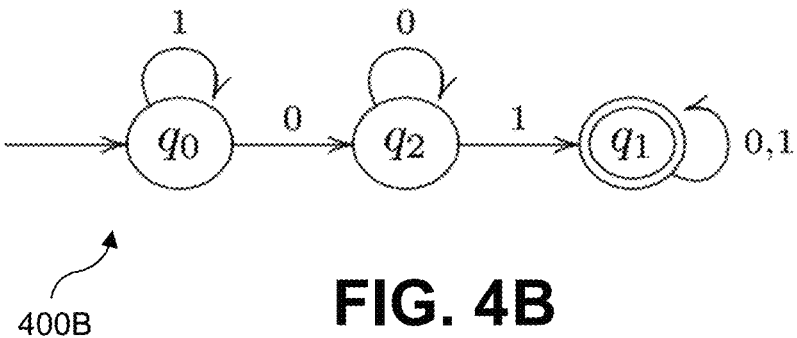
FIG. 4B is a DFA transition diagram corresponding to the DFA transition table of FIG. 4A.

The transition function $\delta$ is a function in,
$Q \times \Sigma \to Q$
where $Q \times \Sigma$ is the set of 2-tuples (q, a) with $q \in Q$ and $a \in \Sigma$ A DFA may be presented graphically as a transition diagram or with a transition table. An example of a transition table 400A is shown in FIG. 4A. The $\to$ indicates the start state: here $q_0$, while the * indicates the final state(s) (here only one final state $q_1$). This defines the transition diagram 400B shown in FIG. 4B.

Figure 5:
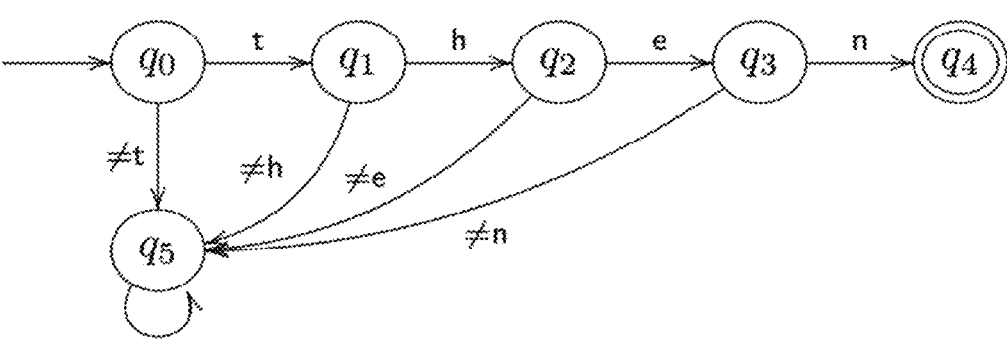
FIG. 5 is a DFA transition diagram corresponding to a DFA configured to accept a userid comprising a character string.

For this example,
$Q = \{q_0, q_1, q_2\}$
start state q0
$F = \{q_1\}$
$\Sigma = \{0, 1\}$
$\delta$ is a function from $Q \times \Sigma$ to $Q$
$\delta: Q \times \Sigma \to Q$
$\delta(q_0, 1) = q_0$
$\delta(q_0, 0) = q_2$ An example of an automaton accepting a password comprising a character string is shown in FIG. 5. It read the character string and accepts it if it stops in an accepting state. In this example the password is "then," and the automaton only excepts the word then while rejecting all other passwords. As shown in FIG. 5, the transition edges are t, h, e, and n. Here $Q = \{q_0, q_1, q_2, q_3, q_4\}$, $\Sigma$ is the set of all characters (e.g., in an alphabet), and $F = \{q_4\}$. $q_5$ is a not accepting state referred to as a "stop" or "dead" state.

The automaton illustrated in FIG. 5 has limited utility for detecting a single password. In practice, automatons and corresponding transition tables are much more complex and are designed for handling arbitrary strings. In this case, the automaton may be designed for a particular language and except strings the are defined by the language. Moreover, detection may be implemented for whole words and subwords.

Consider, for example, an automaton that excepts words that contain 01 as a subword. Under these criteria we have:
$\Sigma = \{0, 1\}$
$L = \{x01y | x, y \in \Sigma^*\}$
We use the following states:
A: start
B: the most recent input was 1 (but not 01 yet)
C: the most recent input was 0 (so if we get a 1 next we should go to the accepting state D)
D: we have encountered 01 (accepting state)

Figure 6:
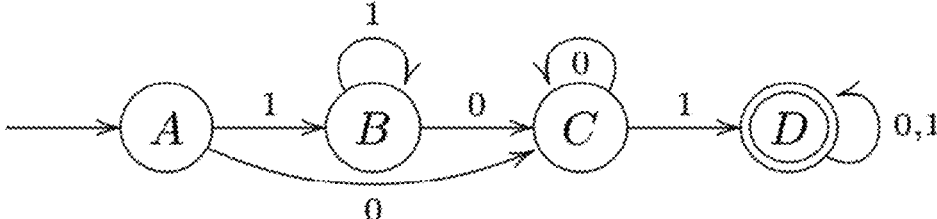
FIG. 6 is a diagram illustrating additional examples of a DFA transition diagram and associated DFA transition table.

The transition diagram and transition table for this automaton is shown in FIG. 6. $Q = \{A,B,C,D\}$, $\Sigma = \{0,1\}$, start state A, final state(s) $\{D\}$. In this example what happens if we get 011, 100, or 10101?

Figure 7:
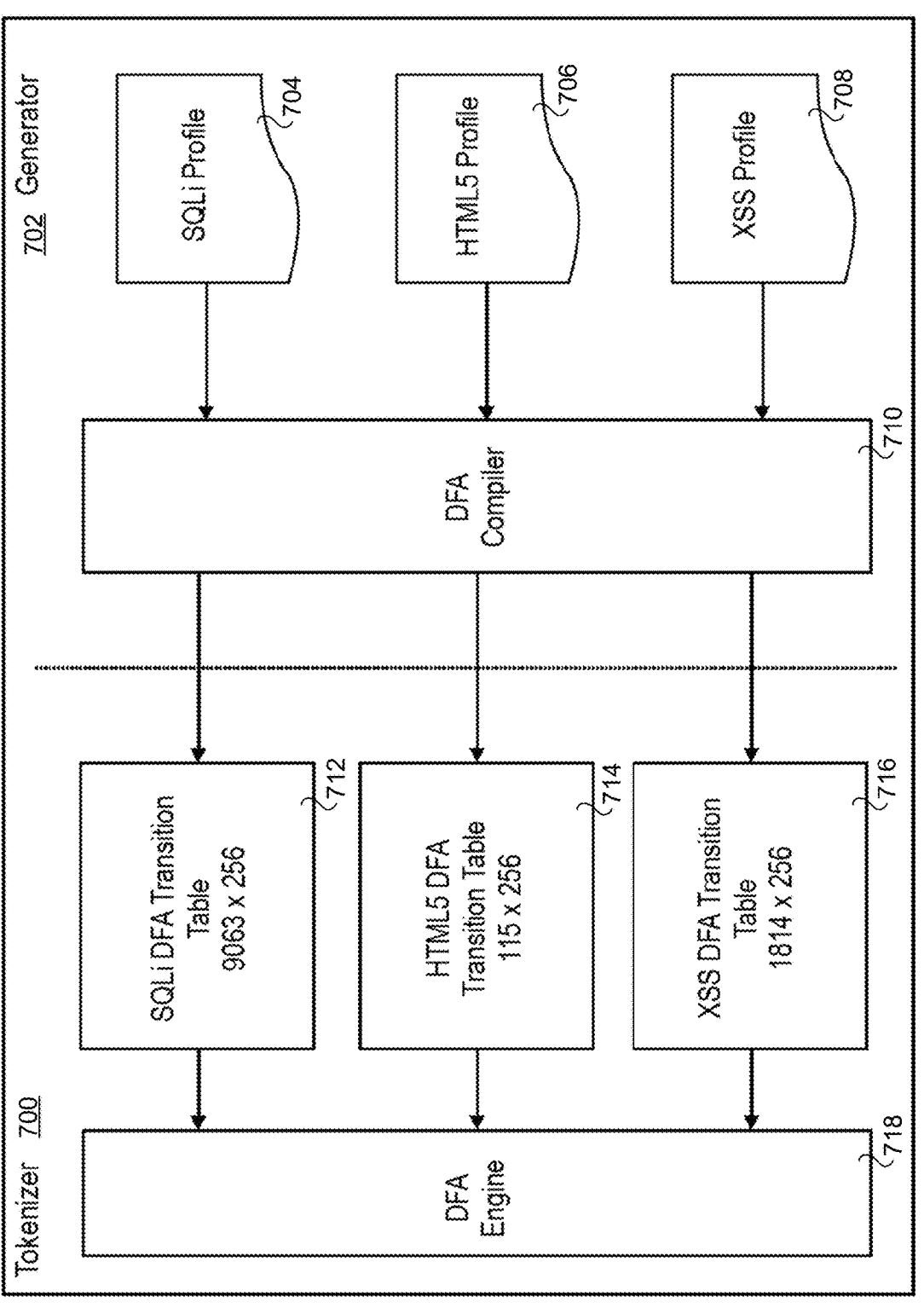
FIG. 7 is a diagram illustrating a DFA tokenizer, according to one embodiment.

We define $\hat{\delta}(q, x)$ by induction:
$\hat{\delta}: Q \times \Sigma^* \to Q$
BASIS $(q, \epsilon) = q$ for $|x| = 0$
INDUCTION suppose x=ay (y is a string, a is a symbol)
$\hat{\delta}(q, ay) = \hat{\delta}(\hat{\delta}(q, a), y)$
Notice that if x=a we have
$\hat{\delta}(q, a) = \delta(q, a)$ since $a = a\epsilon$ and $\hat{\delta}(\delta(q, a), \epsilon) = \delta(q, a)$
$\hat{\delta}: Q \times \Sigma^* \to Q$
We write q.x instead of $\hat{\delta}(q, x)$
We can now define mathematically the language accepted by a given automaton $Q, \Sigma, \delta, q_0, F$
$L = \{x \in \Sigma^* | q_0.x \in F\}$ FIG. 7 shows an abstracted representation of a tokenizer 700 and a generator 702. The generator receives user-defined profiles as inputs, as exemplified by a SQLi profile

704, an HTML5 profile 706, and a Cross-Site Scripting (XSS) profile 708, and processes these inputs using a DFA compiler 710 to generate respective DFA transition tables, as shown by an SQLi DFA transition table 712, an HTML5 DFA transition table 714, and an XSS DFA transition table 716. SQLi DFA transition table 712, HTML5 DFA transition table 714, and/or XSS DFA transition table 716 are used by a DFA engine 718 to convert input strings to token sequences.

The SQLi profile 704 is used to address SQLi attacks, which are discussed above. XSS profile 708 used to address XSS attacks. An XSS attack is a web security vulnerability that allows an attacker to compromise the interactions that users have with a vulnerable application, such as via injection and execution of JavaScript code. It allows an attacker to circumvent the same origin policy, which is designed to segregate different websites from each other. Cross-site scripting vulnerabilities normally allow an attacker to masquerade as a victim user, to carry out any actions that the user is able to perform, and to access any of the user's data. If the victim user has privileged access within the application, then the attacker might be able to gain full control over all the application's functionality and data.

HTML5 profile 710 is used to address HTML injection. An HTML injection is an attack that is similar to an XSS attack. While in the XSS vulnerability the attacker can inject and execute JavaScript code, the HTML injection attack only allows the injection of certain HTML tags. When an application does not properly handle user supplied data, an attacker can supply valid HTML code, typically via a parameter value, and inject their own content into the page. This attack is typically used in conjunction with some form of social engineering, as the attack is exploiting a code-based vulnerability and a user's trust. For example, an HTML injection attack can be used to obtain users' usernames and passwords, where the attacker's injected HTML is rendered and presented to the user asking for a username and password and once entered these data are both sent to the attacker's server.

FIG. 8 shows four general syntax examples that may be used for a profile. Example 800 shows the general syntax for a normal state, which begins with a default STATE0. A transition to the same destination results in a STATE2, default transitions correspond to STATE3, and a transition to end or data (eod) is STATE4.

Example 802 shows a general syntax for an accept state with an output token. The first state STATE1 corresponds to a first TOKEN0. The STATE2, STATE3, and STATE4 are the same as above for example 800.

Example 804 shows a general syntax for making a copy. CONDITION0: copy STATE5 means the successor states of STATE0 under transition condition set CONDITION0 (it could be any normal/default/eod conditions) are the same as STATE5's successor states under condition CONDITION0. For example:

```
state STATE5
   48-57: STATE50
   65-97: STATE51
state STATE0
   48-57, 65-97: copy STATE5
Is the same as:
state STATE0
   48-57: STATE50
   65-97: STATE51
```

Example 806 shows a general "dup(licate)/prepend" syntax. This syntax is used to handle conditions that may generate a match under some conditions, yet not generate a match under other conditions. It is further used to handle backtracking. For instance, consider the last entry CONDITION1: dup STATE6 prepend TOKEN1. This says under a first condition (1), duplicate STATE6 and prepend TOKEN1. As described above, DFA runs forward; however, some parsing logic may need backtracking. For example, if we're running into a keyword parsing logic, the input string might be like: "ABCDE,". If "ABC" is a keyword, when we have run over "ABC", we still cannot say we have matched a keyword unless we processed the next character 'D'. In this case, 'D' is not a delimiter so "ABC" won't generate a match. Also, if "ABCDE" is a keyword, when we ran over "ABCDE", we still have to look at the next character ',', fortunately it's a delimiter, so "ABCDE" will generate a match in this case. This example demonstrates there may be divergence under different conditions, where some conditions will generate a match, while other conditions will not result in a match.

While we cannot do backtracking in DFA, we can put the match corresponding to specific conditions to the successor states by using the "dup/prepend" syntax:

```
state STATE6
   48-57: STATE60
   65-97: STATE61
state STATE0
   48-57, 65-97: dup STATE6 prepend TOKEN1
Is the same as:
state STATE600: TOEKN1
   default: copy STATE60
state STATE610: TOEKN1
   default: copy STATE61
state STATE0
   48-57: STATE600
   65-97: STATE610
```

The profile syntax examples shown in FIG. 8 may be used for SQLi profile 704, HTML5 profile 706, and XSS profile 708, as well as user-defined profiled. In addition, other profile syntax templates may be used in a similar manner.

Figure 9:
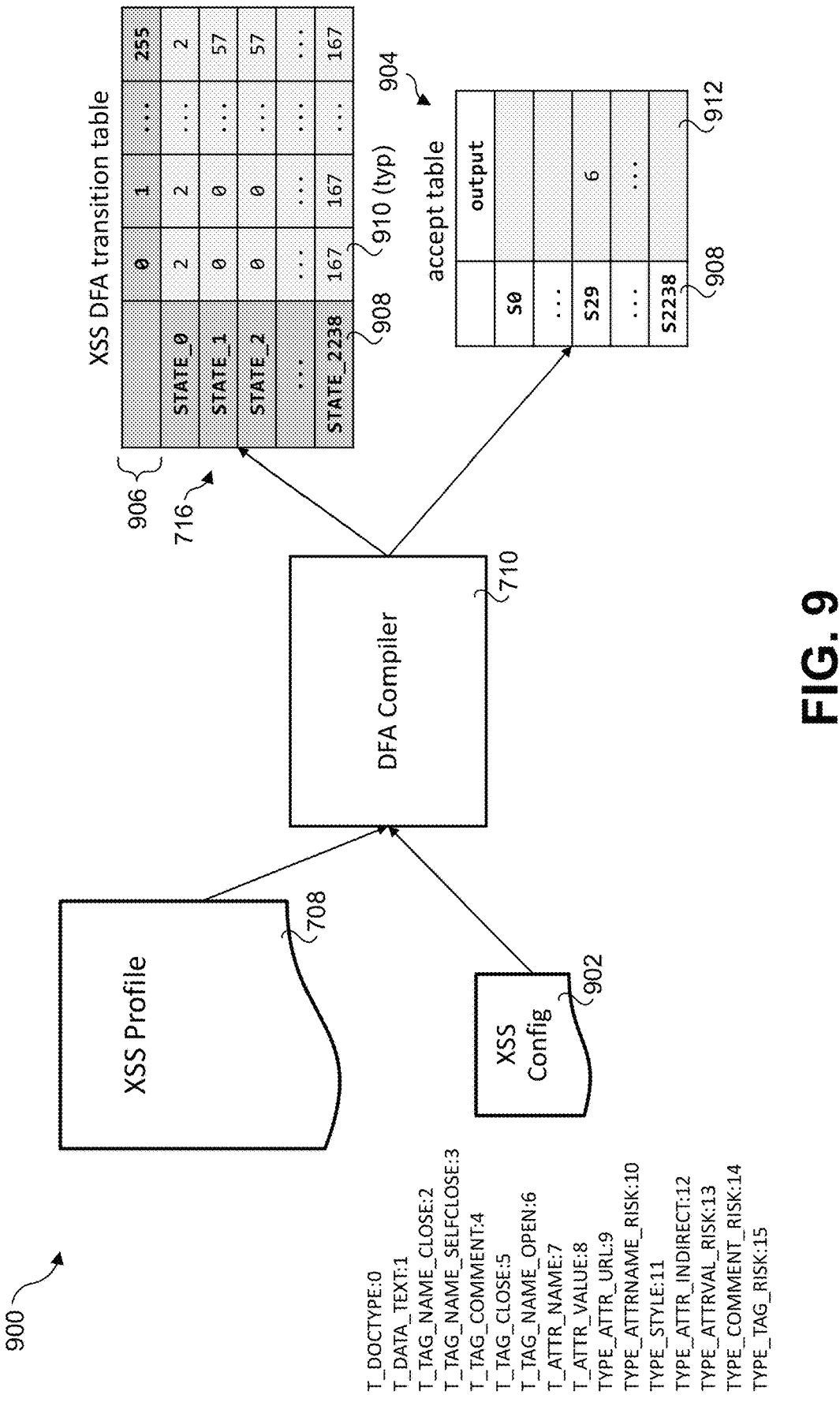
FIG. 9 is a diagram illustrating processing performed by a DFA compiler, according to one embodiment.

FIG. 9 shows a diagram 900 depicted examples of input and output for DFA compiler 710. In this example the inputs include XSS profile 708 and an XSS configuration file 902. The outputs are XSS DFA transition table 716 and an accept table 904. The top row 906 of XSS DFA transition table 716 is populated with characters in the ASCII character set (extended 8-bit ASCII character set). The first column 908 contains the states. The remaining columns 910 contain transition values corresponding to respective ASCII characters. Accept table is used to store acceptable states. It includes a state column 908 with the same state data as XSS DFA transition table 716 and an output column 912. XSS configuration data includes some configuration data to be used by DFA compiler 710.

FIG. 10 shows the end snippet from XSS profile 708. As illustrated, the XSS profile includes multiple state definitions including a list of next characters and applicable rules.

Figure 11:
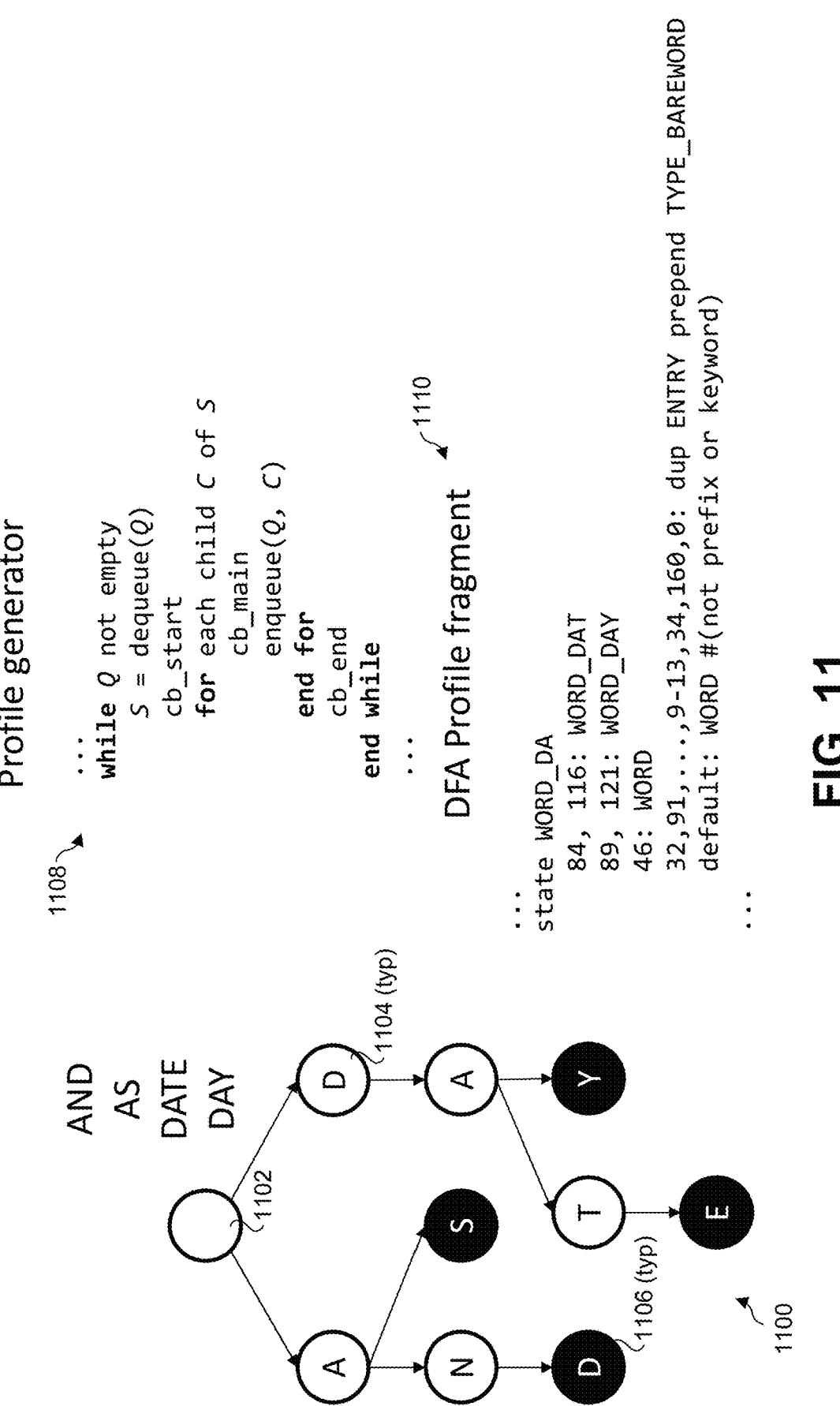
FIG. 11 is a diagram illustrating a DFA transition diagram, pseudocode for a profile generator, and a DFA profile fragment.

FIG. 11 illustrates element profile generation tool. In this example, the DFA is targeted to detect the words "AND", "AS", "DATE", and "DAY", which results in the DFA diagram 1100. The DFA diagram includes nodes representing an initial state 1102, intermediate states 1104 in white and accepted states 1106 in black. The letters 'S', 'D', 'Y', and 'E' are the last letters for "AND", "AS", "DATE", and "DAY".

Profile generator 1108 is a pseudocode snippet illustrating a while loop for generating profile entries. The DFA profile fragment 1110 shows a fragment of a DFA profile that is provided as an input. This fragment defines what to do for a current state of WORD DA (meaning the prior to characters were 'D' 'A'). For a character 'T' having an ASCII value of 84, the WORD becomes "DAT" and the next state is 116 [What is 116]. The second entry for the character 'Y' results in the WORD "DAY", which is an accepted state.

FIG. 12 shows an example of a portion of a DFA profile template 1200. Three profile template entries 1202, 1204, and 1206 are shown. Entry 1202 addresses a current state of WORD ABC (the previous three letters are 'A' 'B' and 'C'). Entry 1202 provides for example next states depending on if the next character is a 'D' or 'd', and 'E' or 'e' and a period (ASCII value of 46). Similarly, entry 1204 addresses a current state of WORD_AS and next states depending on if the next character is a 'D' or 'd', and 'E' or 'e' and a period (ASCII value of 46).

For the problem addressed by entry 1206, state WORD is a self-loop state for bareword (exit from the keyword Trie) until it meets a delimiter, then it can jump to the start state and output a TYPE_BAREWORD token (actually it skipped over the start state itself and directly entered the successor state (duplicated successor state with a output token TYP_BAREWORD) corresponding to the delimiter). The transition flow looks like:

WORD→ENTRY→DELIM
    delimiter |
        →DELIM':TYPE_BAREWORD

FIG. 13 shows another example of a DFA transition table 1300. As before, the first column contains the state, while the remaining columns correspond to input characters for the 8-bit enhanced ASCII character set.

FIG. 13 shows a pseudocode listing 1300 for implementing a DFA engine function performed by DFA engine 718. The inputs are T[][], the state transition table, A[], the accept list, and V, the input vector (string) of characters. The function iterates through each character C in the input string V. In the third line, a next state S is determined using current state of the previous character as defined in the state transition table and C. If the state S is an accept state, then it is added as an output to the accept list A[]. This sequence of operations is repeated until the end of input string V is reached.

Figure 14:
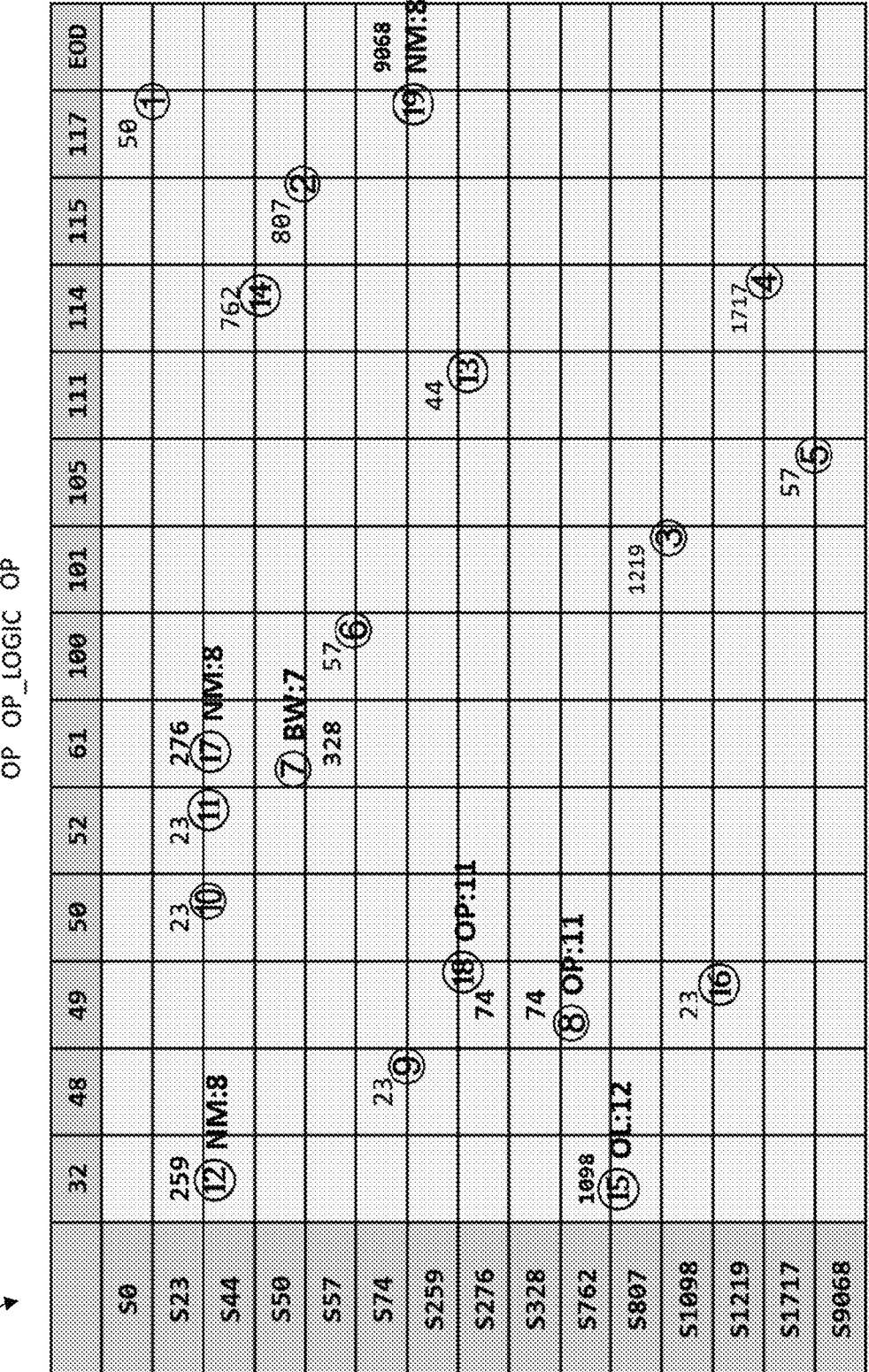
FIG. 14 is an example of a DFA transition table and its use for tokenizing a SQLi query string.

FIG. 14 shows selective rows, columns, and entries for a DFA transition table 1400 that is used by SQLi example described and illustrated herein. As before, the first column contains the state, while the first row contains numerical values for characters defined for the 8-bit enhanced ASCII character set. The values in the table cells are states, while the encircled numbers represent a sequence of steps that are performed by the DFA tokenize to process the SQLi example query string "userid=1024 or 1=1".

As described and illustrated above, for the input (query) string "userid=1024 or 1=1" the token sequence 308 generated by the DFA tokenizer is '7' '11' '8' '12' '8' '11' '8'. As shown by steps '1'-'6' the ASCII values for 'u' 's' 'e' 'r' 'i' and 'd' are 117, 115, 101, 114, 105, and 100, and the corresponding states 50, 807, 1219, 1717, 57, and 57. None of these are accepted states. However, the next character is '=', which corresponds to an accepted state 328 with a token value of '7', as shown in the seventh step. A similar pattern is performed to identify the other accept states and tokens for the remaining token sequence '11' '8' '12' '8' '11' '8'. For example, at step '8' corresponding to '=' the ASCII value is 49 and the state is 74 which is an accepted state for an operator (OP) with a corresponding token of '11'.

Figure 16:
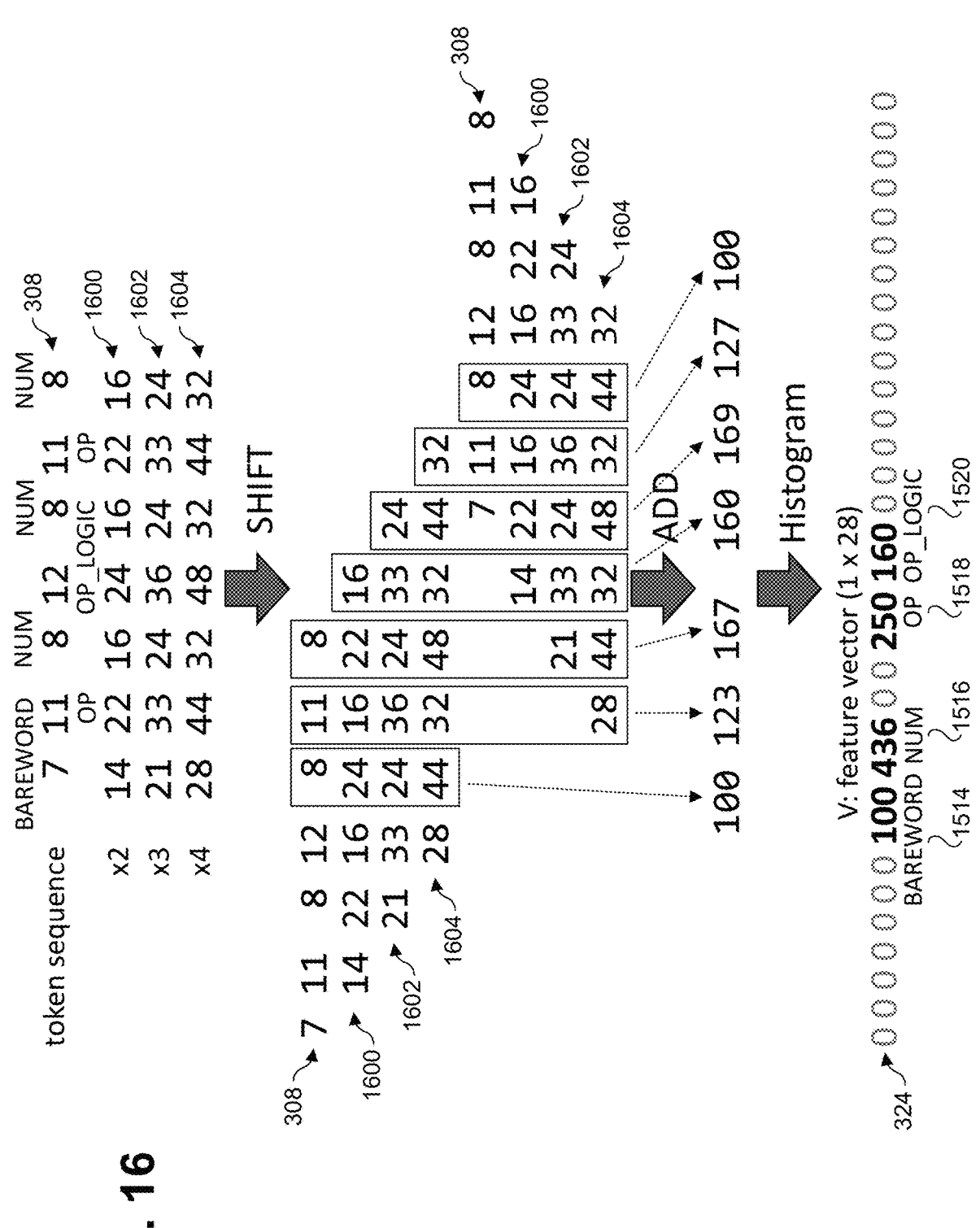
FIG. 16 is a diagram illustrating further details for converting the token sequence of FIG. 15 into a feature vector, according to one embodiment.

FIGS. 15 and 16 show an example of converting a token sequence 308 into a feature vector 324. As described above with reference to FIG. 3, For query string 204 of "userid=1024 or 1=1" the token sequence '7' '11' '8' '12' '8' '11' '8' corresponds to a bareword 310 'userid', op (operator) 312 '=', num(ber) 314 '1024', op_local (local operator) 316 'or', num 318 '1', op 320 '=', and num 322 '1'. The token sequence '7' '11' '8' '12' '8' '11' '8' is processed as follows.

Under the feature vector encoding scheme, the values for a given token type are added and a single aggregate value for that type is encoded. The types include a bareword 316, operators (op) 312 and 320, numbers (num) 314, 318, and 322, and a local operator (op_local) 316. The aggregate value for each type begins at '0'. First a value of 100 corresponding to vector component 1500 for the bareword token '7' (V[7]) is added to '0', which is calculated as (11×4)+(8×3)+(12×2)+(8×1)=100. In a similar manner, the following vector component are calculated: vector component 1502 (V[11])+=123; vector component 1504 (V[8])+=167; vector component 1506 (V[12])+=160; vector component 1508 (V[8])+=169; vector component 1510 (V[11])+=127; and vector component 1512 (V[8])+=100. The aggregate value for op tokens '11' (V[11]) is 123+127=250. The value for op_logic token '12' is set to 160. Finally, the aggregate value for the num tokens '8' (V[8]) is 167+169+100=436. The value for these different token types are then encoded in feature value 324, as bareword vector 1514, a num vector 1516, an op vector 1518, and an op_logic vector 1520.

FIG. 16 graphically depicts how the feature vector components are calculated using SIMD (Single Input Multiple Data) instructions. The process begins with token sequence 308 at the top of the figure. The token values in token sequence 308 are multiple by two to obtain a sequence 1600, by three to obtain a sequence 1602, and by four to obtain a sequence 1604. Token sequence 308 and sequences 1600, 1602, and 1604 are shifted as shown in the middle portion of FIG. 16. The values in the columns under the '7' '11' '8' '12' '8' '11' and '8' are then added to obtain respective sums 100, 123, 167, 160, 169, 127, and 100. As discussed above, these sums are then aggregated by token type, resulting in the feature vector 324.

Figure 17:
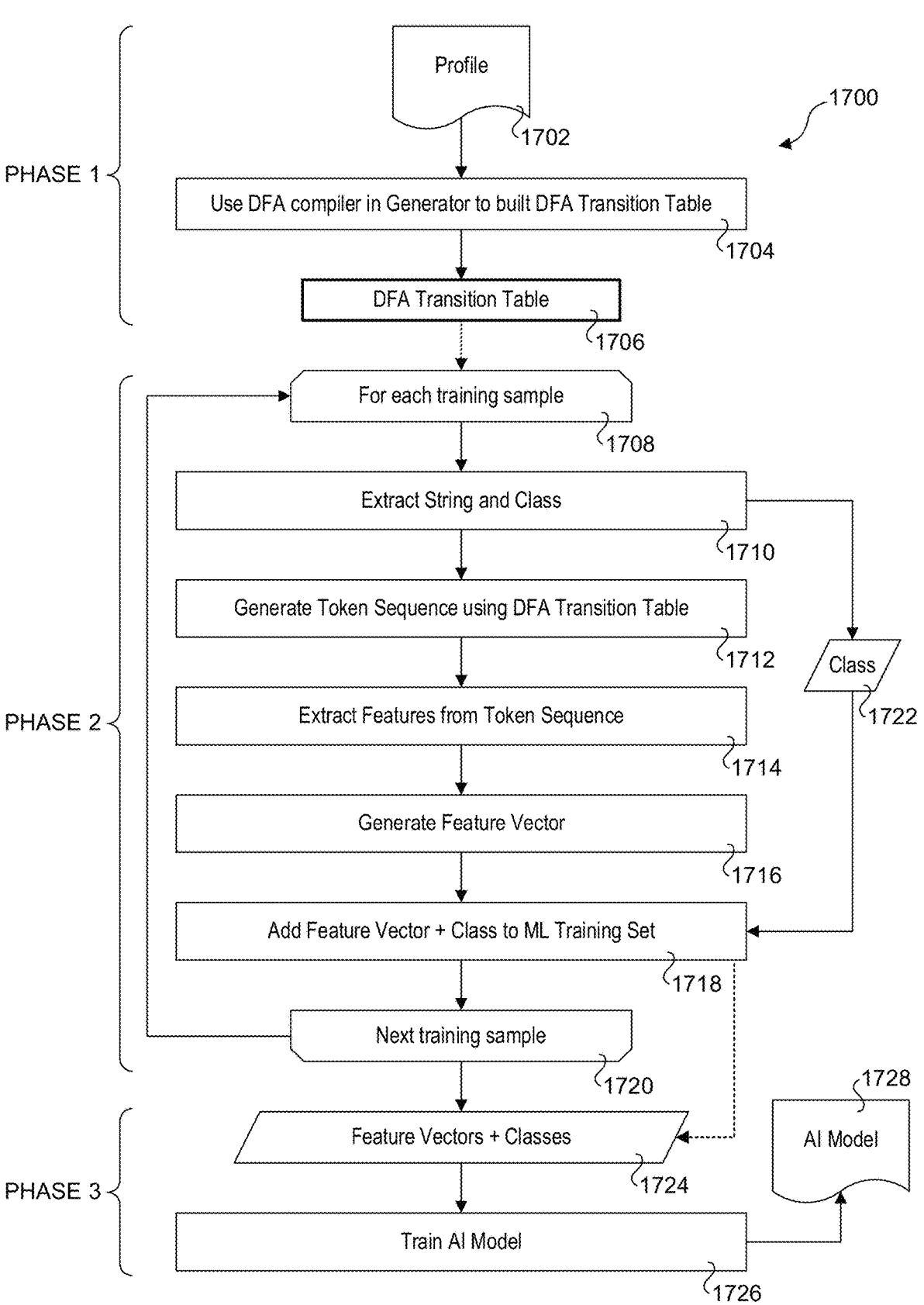
FIG. 17 is a flowchart illustrating operations and logic for generating a DFA transition table, employing the DFA transition table to create a machine learning training set comprising classified feature vectors from a set of training samples, and employ the classified feature vectors to train an AI model.

FIG. 17 shows a flowchart illustrating operations and logic for building a DFA transition table for a given profile (e.g., user-defined profile) and employing the DFA transition table for training an ML/AI model. As illustrated, the process involves three phases. During the first phase, entries in a profile 1702 are processed in a block 1704 using the DFA compiler 710 in the generator 702 to generate a DFA transition table 1706. This DFA transition table is then used for both training an AI model and for subsequent run-time operations to filter out malicious inputs.

During the second phase, a machine learning training set is generated that is used during the third phase to train the ML model. As shown by start and end loop blocks 1708 and 1720, the operations depicted in blocks 1710, 1712, 1714, 1716, and 1718 are performed for each training sample. These training samples comprise strings that are pre-classified as either benign or malicious. For example, for the SQLi training samples may comprise SQL statements or snippets of SQL statements known to be either benign or potentially malicious (the latter being classified as malicious). The training sample entries will consist of a string +a classification value. For the binary classifier used here, the binary values may be '1' for malicious and '0' for not malicious, for example.

In block 1710 the strings and class portions are extracted from the training sample, with the class 1722 being stripped out leaving the string. In block 1712 the string is processed by DFA engine 718 to generate a token sequence. The operations in blocks 1714 and 1716 are performed by the feature extraction engine (e.g., feature extraction engine 306), to extract features from the token sequence and generate a feature vector. An example of this is illustrated in FIG. 11 and discussed below. In block 1718 the feature vector that is generated and the class for the training sample are concatenated to form a ML training set entry, which is added to an ML training set 1724. As explained above and illustrated above, the feature vectors will generally be sparse vectors under which many or most of the column entries for the feature vectors are '0'. As shown in end block 1720, the logic loops back to start loop block 1708 to process the next training sample.

The processing of the training samples in phase 2, ML training set 1714 will have many entries. Generally, the number of entries may vary depending on the size of the corpus of training samples available. Depending on the profile, training samples may be readily available (e.g., based on observation of previous injection attacks) or may be machine or hand generated. For example, existing tools such as SQLmap may be used to generate SQLi query strings comprising training samples. Similarly, tools such as XSStrike may be used to generate training samples comprising XSS code used for XSS attacks.

During phase 3, ML training set 1714 is used to train an AI model 1728 in a block 1726 using conventional machine learning training practices. For example, an AI model may be trained using a single training set or multiple training sets. AI models may also be trained using a distributed architecture.

Figure 18:
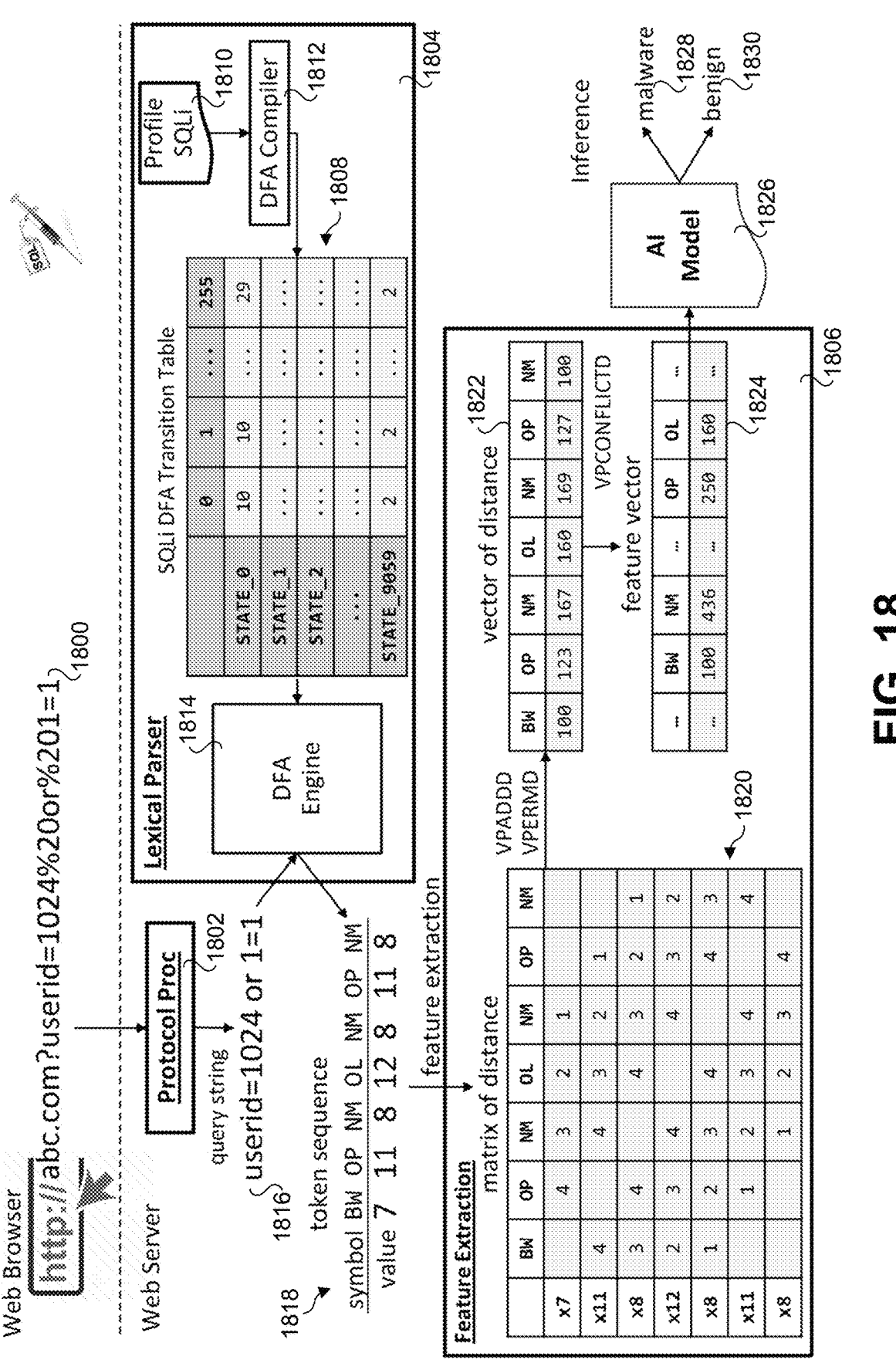
FIG. 18 is a diagram illustrating an embodiment of a WAF solution employing a lexical parser, a feature extraction block, and an AI model that are used to detect SQL injection attacks.

FIG. 18 shows the process for handling an http request that may contain an SQLi string. A Web browser submits (sends) an HTTP request 1800 to a Web server. The Web server includes a protocol process 1802, a lexical parser 1804 and a feature extraction block 1806, such as implemented by a feature extraction engine. Lexical parser 1804 comprises a DFA tokenizer that includes an SQLi DFA transition table 1808 that has been previously generated by processing an SQLi profile 1810 with a DFA compiler 1812. Lexical parser 1804 further includes a DFA engine 1814.

Upon receipt of HTTP request 1800, the HTTP request is parsed by protocol process 1802 to extract a query string 1816. The query string is submitted to DFA engine 1814 which employs SQLi DFA transition table 1808 to generate a token sequence 1818. In this example token sequence 1818 includes token values '7' '11' '8' '12' '8' '11' and '8' as before. Each of these token values has an associated symbol, resulting in a symbol sequence of 'BW' (bareword) 'OP' (operator) 'NM' (number) 'OL' (logic operator) 'NM' 'OP' and 'NM'.

In feature extraction block 1806 a feature extraction distance matrix 1820 is implemented with the token sequence values in respective rows in the first column and token sequence symbols in the first row, as illustrated. The values in the cells of distance matrix 1820 correspond to the multipliers shown at the top of FIG. 16 (e.g., 1=1×, 2=2×, 3=3×, 4=4×).

Data in feature extraction distance matrix 1820 is processed using a VPADDD SIMD (Single Input Multiple Data) instruction and a VPERMD SIMD instruction to generate a distance vector 1822. Data in the distance vector are then processed using a VPCONFLICTD SIMD instruction to generate a feature vector 1824. As illustrated, each feature extraction distance matrix 1820, and distance vector 1822 include columns corresponding to the symbol sequence 'BW' 'OP' 'NM' 'OL' 'NM' 'OP' and 'NM'.

VPCONFLICTD detect conflicts within a vector of packed Dword/Qword and generates a histogram comprising feature vector 1824 by summing the symbol values in distance vector 1822.

Feature vector 1824 is provided as an input to an AI model 1826 that has been previously trained with a training dataset comprising feature vectors that are generated in a similar manner through processing of an SQLi training set of query strings, such as but not limited to being generated by SQLmap. AI model evaluates feature vector 1824 and classifies it as malware 1828 or benign 1830.

FIG. 19 shows an example of the features and associated tokens for the 28 columns in the feature vector encoding format. Most feature vectors will only comprise tokens corresponding to a portion of the 28 features. As a result, they will be sparsely encoded, such as shown by feature vector 324 illustrated herein. Various types of Machine learning and AI models that are known in the art can obtain very high classification accuracy when operating on sparsely encoded features vectors. Moreover, such ML and AI models can classify a feature vector with only 28 columns in on the order of a microsecond (us) or less using off-the-shelf server hardware.

FIG. 20 shows a table illustrating comparative result of some conventional approaches when compared to an embodiment of the solution disclosed herein. These results were obtained by executing software on servers with the same or similar processors and have been normalized. As shown, the test embodiment was able to classify a query string in approximately 1 microsecond, which is more than 100 times faster than using a conventional Regex approach and is on the order of 1000 times faster than using a conventional machine learning approach. It is approximately 66% faster than using Libinjection.

The accuracy of embodiments of the solutions described and illustrated herein are also very accurate (100% accurate for some test SQLi test data involving 22392 samples and 99.8% accurate for some test XSS data involving 2032 samples). Moreover, the solutions are enabled to detect and block malicious query strings that are bypasses (allowed through) using Libinjection.

Figure 21:
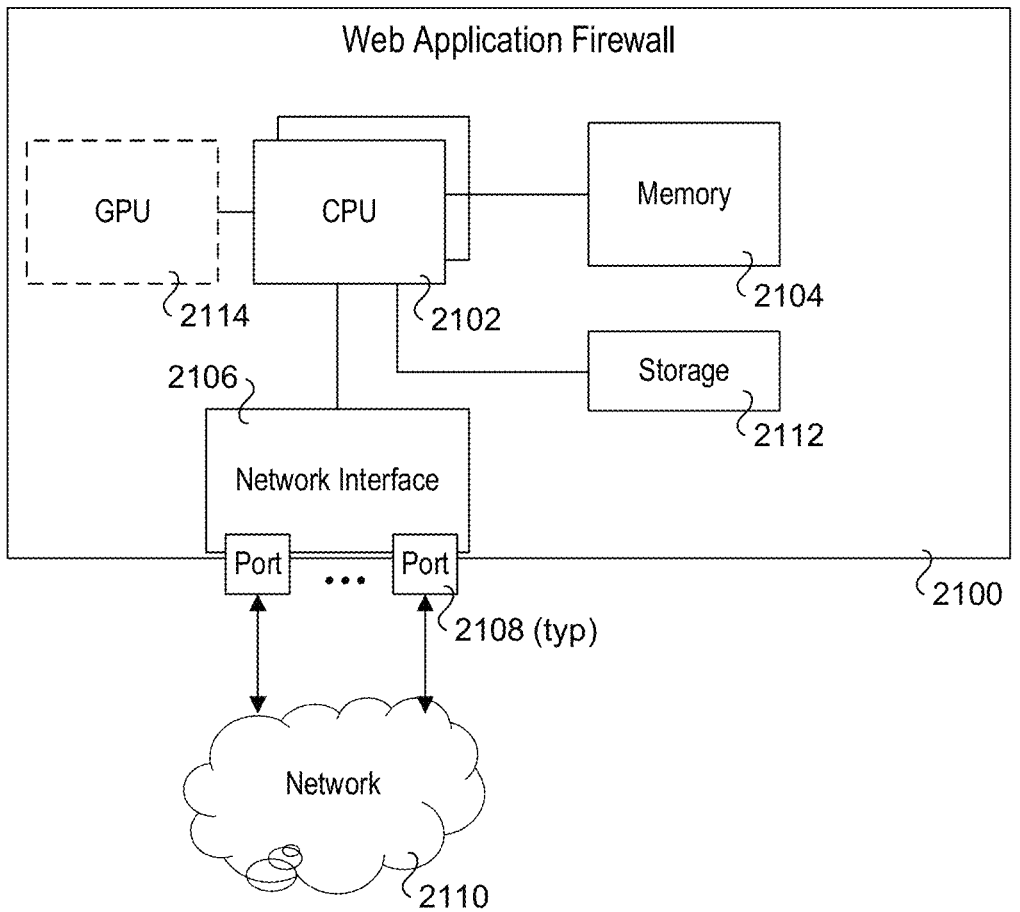
FIG. 21 is a block diagram of a Web Application Firewall in which aspects of the embodiments disclosed herein may be implemented.

FIG. 21 shows an embodiment of a Web Application Firewall 2100 in which aspects of the embodiments disclosed herein may be implemented. Generally, a WAF may be implemented using a server or similar platform, or may be implemented in other types of platforms, such as an Infrastructure Processing Unit (IPU) or Data Processor Unit (DPU). The WAF example shown in FIG. 21 employs a server platform including one or more CPUs 2102 coupled to memory 2104 and a network interface including one or more ports 2108 coupled to a network 2110. WAF 2100 also includes a storage device 2112 coupled to one or more of the CPUs 2102 and an optional Graphics Processor Unit (GPU) 2114.

CPUs 2102 are representative of various types of central processor units, which are also commonly referred to as processors. In some embodiments, a CPU comprises a multi-core CPU with multiple processor cores. CPUs 2102 may also employ a System on Chip (SoCs) architecture. In some embodiments, CPUs 2102 may have an integrated GPU and/or integrated circuitry for performing AI operations. Generally, a CPU may employ one or various instruction set architectures, including but not limited to an x86 architecture, an ARM® architecture. CPUs such as Apple® Corporation's M1 and M2 SoCs may also be used.

All or a portion of the software for implementing aspects of the embodiments described above may be executed on the one or more CPUs 2102. In servers having a GPU (or multiple GPUs), a portion of the software may be executed on the GPU(s), such as but not limited to software for implementing an AI model. The software may be stored in storage device 2112 or loaded from network 2110 into memory 2104.

In addition to CPUs and processor SoCs, a WAF may employs Other Processing Units (collectively termed XPUs) including one or more of Graphic Processor Units (GPUs) or General Purpose GPUs (GP-GPUs), Tensor Processing Units (TPUs), DPUs, IPUs, AI processors or AI inference units and/or other accelerators, FPGAs (Field Programmable Gate Arrays) and/or other programmable logic (used for compute purposes), etc. While some of the diagrams herein show the use of CPUs, this is merely exemplary and non-limiting. Generally, any type of XPU may be used in place of a CPU in the illustrated embodiments. Moreover, as used in the following claims, the term "processor" is used to generically cover CPUs and various forms of XPUs.

Although some embodiments have been described in reference to particular implementations, other implementations are possible according to some embodiments. Additionally, the arrangement and/or order of elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

In the description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other. Additionally, "communicatively coupled" means that two or more elements that may or may not be in direct contact with each other, are enabled to communicate with each other. For example, if component A is connected to component B, which in turn is connected to component C, component A may be communicatively coupled to component C using component B as an intermediary component.

An embodiment is an implementation or example of the inventions. Reference in the specification to "an embodiment," "one embodiment," "some embodiments," or "other embodiments" means that a particular feature, structure, or characteristic described in connection with the embodiments is included in at least some embodiments, but not necessarily all embodiments, of the inventions. The various appearances "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

As discussed above, various aspects of the embodiments herein may be facilitated by corresponding software and/or firmware components and applications, such as software and/or firmware executed by an embedded processor or the like. Thus, embodiments of this invention may be used as or to support a software program, software modules, firmware, and/or distributed software executed upon some form of processor, processing core or embedded logic a virtual machine running on a processor or core or otherwise implemented or realized upon or within a non-transitory computer-readable or machine-readable storage medium. A non-transitory computer-readable or machine-readable storage medium includes any mechanism for storing or transmitting information in a form readable by a machine (e.g., a computer). For example, a non-transitory computer-readable or machine-readable storage medium includes any mechanism that provides (e.g., stores and/or transmits) information in a form accessible by a computer or computing machine (e.g., computing device, electronic system, etc.), such as recordable/non-recordable media (e.g., read only memory (ROM), random access memory (RAM), magnetic disk storage media, optical storage media, flash memory devices, etc.). The content may be directly executable ("object" or "executable" form), source code, or difference code ("delta" or "patch" code). A non-transitory computer-readable or machine-readable storage medium may also include a storage or database from which content can be downloaded. The non-transitory computer-readable or machine-readable storage medium may also include a device or product having content stored thereon at a time of sale or delivery. Thus, delivering a device with stored content, or offering content for download over a communication medium may be understood as providing an article of manufacture comprising a non-transitory computer-readable or machine-readable storage medium with such content described herein.

Various components referred to above as processes, servers, or tools described herein may be a means for performing the functions described. The operations and functions performed by various components described herein may be implemented by software running on a processing element, via embedded hardware or the like, or any combination of hardware and software. Such components may be implemented as software modules, hardware modules, special-purpose hardware (e.g., application specific hardware, ASICs, DSPs, etc.), embedded controllers, hardwired circuitry, hardware logic, etc. Software content (e.g., data, instructions, configuration information, etc.) may be provided via an article of manufacture including non-transitory computer-readable or machine-readable storage medium, which provides content that represents instructions that can be executed. The content may result in a computer performing various functions/operations described herein.

As used herein, a list of items joined by the term "at least one of" can mean any combination of the listed terms. For example, the phrase "at least one of A, B or C" can mean A; B; C; A and B; A and C; B and C; or A, B and C.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the drawings. Rather, the scope of the invention is to be determined entirely by the following claims, which are to be construed in accordance with established doctrines of claim interpretation.

What is claimed is:

1. A method for determining whether an input received via a network is malicious, comprising:
   extracting a string from the input;
   converting the string to a token sequence using a Deterministic Finite Automata (DFA) tokenizer;
   processing the token sequence to generate a feature vector; and
   classifying the feature vector using an artificial intelligence (AI) model to determine whether the input is malicious or benign.

2. The method of claim 1, wherein the string comprises a Structured Query Language (SQL) string and the method is used for detecting SQL injection (SQLi), further comprising:
   generating an SQLi DFA transition table;
   employing the SQLi DFA transition table in the DFA tokenizer to convert the string to the token sequence.

3. The method of claim 2, further comprising:
   processing a plurality of strings comprising samples of malicious and benign SQL code with the DFA tokenizer to generate token sequences;
   extracting features from the token sequences to generate feature vectors; and
   training the AI model with the feature vectors that are generated.

4. The method of claim 1, wherein the string comprises a Cross-Site Scripting (XSS) string and the method is used for detecting malicious XSS code, further comprising:
   generating an XSS DFA transition table;
   employing the XSS DFA transition table in the DFA tokenizer to convert the XSS string to the token sequence.

5. The method of claim 4, further comprising:
   processing a plurality of strings comprising samples of malicious and benign XSS code with the DFA tokenizer to generate token sequences;
   extracting features from the token sequences to generate feature vectors; and
   training the AI model with the feature vectors that are generated.

6. The method of claim 1, wherein processing the token sequence to generate a feature vector employs execution of multiple Single Instruction Multiple Data (SIMD) instructions.

7. The method of claim 1, further comprising:
   generating a DFA transition table by processing a user-defined profile comprising a plurality of strings with a DFA compiler;
   employing the DFA transition table in the DFA tokenizer;
   processing at least a portion of the plurality of strings in the user-defined profile with the DFA tokenizer to generate token sequences;
   extracting features from the token sequences to generate feature vectors; and
   training the AI model with the feature vectors that are generated.

8. The method of claim 7, wherein the plurality of strings in the user-defined profile employ lexical encoding.

9. The method of claim 1, further comprising implementing the method in a firewall.

10. A non-transitory machine-readable medium having instructions comprising software modules stored thereon comprising instructions configured to be executed by one or more processors in one or more computer system, the software modules including:
   a Deterministic Finite Automata (DFA) compiler, configured to process a profile comprising a plurality of strings and associated rules and generate a DFA transition table;
   a DFA engine, configured to receive an input string and generate a token sequence using the DFA transition table; and
   a feature extraction engine, configured to extract features from the token sequences generated by the DFA engine and convert the extracted features into feature vectors,
   wherein the feature vectors are configured to be used to train an artificial intelligence (AI) model to detect whether inputs comprising strings are malicious or benign.

11. The non-transitory machine-readable medium of claim 10, wherein the profile is a user-defined profile comprising alphanumeric strings corresponding to a natural language.

12. The non-transitory machine-readable medium of claim 10, wherein the profile is a user-defined profile comprising alphanumeric strings having a lexical coding.

13. The non-transitory machine-readable medium of claim 10, wherein the profile is a Structured Query Language injection (SQLi) profile, and wherein the DFA compiler generates an SQLi DFA transition table that is used by the DFA engine to generate token sequences.

14. The non-transitory machine-readable medium of claim 10, wherein the profile is a Cross-Site Scripting (XSS) profile, and wherein the DFA compiler generates an XSS DFA transition table that is used by the DFA engine to generate token sequences.

15. The non-transitory machine-readable medium of claim 10, wherein the feature extraction engine employs a plurality of Single Input Multiple Data (SIMD) instructions to convert a token sequence into a feature vector.

16. A Web Application Firewall (WAF) comprising:
   one or more processors;
   memory, operatively coupled to the one or more processors;
   at least one network interface having one or more ports, operatively coupled to the processor; and software instructions comprising a Deterministic Finite Automata (DFA) tokenizer, a feature extraction engine, and a machine learning model configured to perform binary classification, where the WAF is enabled, via execution of the software instructions to:

extract strings from inputs received at least one of the one or more ports of the network interface;

convert the strings to token sequences using the (DFA) tokenizer;

process the token sequences with the feature extraction engine to generate feature vectors; and classify the feature vectors using the machine learning model to determine whether the inputs are malicious or benign.

17. The WAF of claim 16, further comprising one or more DFA transition tables stored in the memory, wherein the DFA tokenizer uses the one or more DFA transition tables to convert extracted strings into token sequences.

18. The WAF of claim 17, wherein the one or more DFA transition tables include one or more of a Structured Query Language injection (SQLi) DFA transition table, a Hypertext Markup Language (HTML) 5 DFA transition table, and a Cross-Site Scripting (XSS) DFA transition table.

19. The WAF of claim 16, wherein the one or more processors comprising a plurality of processors implemented in multiple computer systems, and wherein the software instructions comprise a plurality of modules that are configured to be distributed across the multiple computer systems.

20. The WAF of claim 16, wherein the feature extraction engine employs execution of multiple Single Instruction Multiple Data (SIMD) instructions to process the token sequence to generate a feature vector.

* * * * *